United States Patent [19]

Wideman

[11] 3,898,296

[45] Aug. 5, 1975

[54] SELECTIVE CYCLODIMERIZATION OF 1,3-BUTADIENE CONTAINED IN A COMMERCIAL C-4 HYDROCARBON STREAM

[75] Inventor: Lawson G. Wideman, Akron, Ohio

[73] Assignee: The Goodyear Tire & Rubber Company, Akron, Ohio

[22] Filed: Nov. 1, 1973

[21] Appl. No.: 411,971

[52] U.S. Cl. ............................. 260/666 B; 260/677
[51] Int. Cl. ............................................ C07c 13/00
[58] Field of Search ...................... 260/666 B, 677

[56] References Cited
UNITED STATES PATENTS

| | | | |
|---|---|---|---|
| 3,326,990 | 6/1967 | Clark | 260/666 B |
| 3,446,861 | 5/1969 | Menapace et al. | 260/666 B |
| 3,446,862 | 5/1969 | Menapace et al. | 260/666 B |
| 3,542,887 | 11/1970 | Hillepass et al. | 260/666 B |

Primary Examiner—Veronica O'Keefe
Attorney, Agent, or Firm—F. W. Brunner; J. Y. Clowney

[57] ABSTRACT

There is disclosed a method of recovering the 1,3-butadiene values from a commercial crude C-4 hydrocarbon stream comprising selectively dimerizing the butadiene values of 1,5-cyclooctadiene, flash distilling to separate the C-4 hydrocarbons from the 1,5-cyclooctadiene. The catalyst employed in the cyclodimerization step comprises (1) iron salts or iron complexes, (2) an organometallic reducing agent and (3) certain ligands containing nitrogen.

3 Claims, No Drawings

SELECTIVE CYCLODIMERIZATION OF 1,3-BUTADIENE CONTAINED IN A COMMERCIAL C-4 HYDROCARBON STREAM

This invention is directed to a process by which 1,3-butadiene values can be extracted from raw commercially available hydrocarbon streams in which the hydrocarbons contain four carbon atoms (C-4 streams or C-4 hydrocarbons).

As a result of steam cracking of naphtha or gas oil, a variety of hydrocarbon streams can be isolated from the effluent from the steam cracker. This effluent can then be separated into various streams by simple distillation into streams containing two carbon atoms (C-2 hydrocarbons or C-2 streams) such as ethylene and ethane; streams containing C-3 hydrocarbons, such as propane and propylene; C-4 hydrocarbons, such as butadiene, butane and butenes; and C-5 hydrocarbons containing isoprene, piperylene, isopentene and isopentanes, pentanes and pentenes and so on. It is the C-4 hydrocarbon streams to which this invention is directed.

These commercially available C-4 hydrocarbon streams contain from about 20 to about 40 percent of 1,3-butadiene, the remainder being at least eight other C-4 hydrocarbons, mainly isobutylene, cis- and trans-2-butene, 1-butene, n-butane and isobutane.

Thus, to extract the butadiene values from this stream containing the variety of C-4 hydrocarbons requires a somewhat sophisticated distillation process and/or an extractive distillation process using a selected solvent to absorb the butadiene values out of the mixture of C-4 hydrocarbons. Both of these processes are extremely costly in that the distillation process requires a column with a large number of plates and high utilities costs and the extractive process requires the use of an expensive extractive solvent, usually polar in nature and complex equipment including distillation having a high energy requirement.

The present invention provides a method whereby the 1,3-butadiene values may be recovered from a mixed stream containing hydrocarbons having four carbon atoms (C-4 hydrocarbons) at a cost substantially lower than these known processes.

According to the invention, the butadiene values in a commercial C-4 hydrocarbon stream are separated from the stream by selectively cyclodimerizing the butadiene values to 1,5-cyclooctadiene with a catalyst comprising (1) at least one material selected from the group consisting of iron salts and iron complexes, (2) at least one reducing agent selected from the group consisting of organo metallic compounds and metallic hydrides, the metal portions of which are selected from Groups Ia, IIa, IIb and IIIa of the Periodic System of Elements and (3) at least one ligand selected from the group represented by the formulae:

$$R'-N=C-C=N-R''$$
$$\phantom{R'-N=C-}R\phantom{-}R$$

$$R'-N=C-C=O$$
$$\phantom{R'-N=}R$$

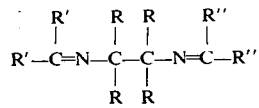

and

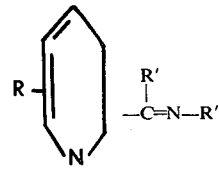

wherein R may be hydrogen, an alkyl group of 1 to 6 carbon atoms or an aryl radical, and R' and R'' are hydrocarbons of 4 to 10 carbon atoms and containing double bond unsaturation in conjugation with the C=N unsaturation, and wherein N is nitrogen and O is oxygen, then subjecting the mixture to a simple flash distillation to separate the C-4 hydrocarbons from the 1,5-cyclooctadiene.

The iron salts useful in the practice of this invention are preferably the iron salts of carboxylic acids containing from about 2 to about 40 carbon atoms. Representative but no means exhaustive of the iron salts of such carboxylic acids include ferric acetate, ferric propionate, ferric isobutyrate, ferric-n-butyrate, ferric trimethyl acetate, ferric n-pentanoate, ferric 3-methyl butyrate, ferric decanoate, ferrate octanoate and ferric benzoate and various other iron salts of other carboxylic acids. Also useful in this invention as an iron salt are the ferric salts of alkyl substituted naphthenic carboxylic acids, and the ferric soaps or the soap called iron drier compounds. The ferric salts of individual naphthenic acids are rarely found because the naphthenic acids are usually complex mixtures with their common derivatives being cyclopentane, cyclohexane, cycloheptane and the higher molecular weight alkyl substituted analogs. The cyclic soaps useful in this invention are usually iron in combination with fatty acids such as stearic rosin (resinates) and tall oil (tallate). Also inorganic iron salts, such as chlorides, bromides, iodides, carbonate, nitrate, sulfate, may be employed.

The iron complexes useful in the invention are the ferric complexes of such agents as 1,3-diketones. Representative of such complexes are ferric 2,4-pentanedionate (commonly called ferric acetylacetonate), ferric-3-methyl-2,4-pentanedionate, ferric-1-ethoxy-1,3-butanedionate, ferric-1,3-diethoxy-1,3-propanedionate, ferric-1,3-diphenyl-1,3-propanedionate, ferric-1-cyclohexyl-1,3-butanedionate and other ferric complexes of 1,3-diketones.

Of all the compounds useful as the ferric salt or ferric complex in this invention, the ferric carboxylic acid salts, such as ferric decanoate, ferric octanoate and ferric acetylacetonate are preferred.

The second component of the catalyst system are reducing agents consisting of at least one member of the class of metal compounds selected from the group consisting of organometallic compounds and hydrides of elements of Groups Ia, IIa, IIb and IIIa of the Periodic System of Elements. The preferred metallic elements from the above groups are lithium, sodium, potassium, magnesium, calcium, boron and aluminum. Representative but not all inclusive of suitable compounds of the above metallic elements are lithium hydride, calcium hydride, aluminum hydride, phenyl sodium, phenyl lithium, n-butyl lithium, tertiary butyl lithium, benzyl potassium, phenyl magnesium chloride, ethyl magnesium bromide, diethyl magnesium, triethyl aluminum, triisobutyl aluminum, dibutyl zinc, diethyl zinc and the like. Trialkylaluminums such as triethylaluminum is the preferred organometallic compound for use with this invention.

The third component of the ternary catalyst system of this invention consists of an organic ligand type molecule. The ligand is believed to direct the reaction toward the cyclodimer formation wherein the cyclodimer contains all the carbon atoms in the 1,3-butadiene hydrocarbon spine. For instance, the ligand is believed to result in the high selectivity of 1,5-cyclooctadiene from 1,3-butadiene. The class of ligands which is employed in the present invention are those ligands responding to the formula:

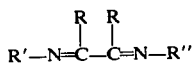

wherein R may be hydrogen, an alkyl radical of 1 to 6 carbons or an aryl radical; and R' and R" are hydrocarbons of 4 to 10 carbons containing double bond unsaturation in conjugation with the C=N unsaturation. These ligands may be described as imines. Representative examples of such ligands are: biacetyl-bis-(2,4,6-trimethyl-anil), biacetyl-bis-(2-trifluoromethylanil), biacetyl-bis-anil, biacetyl-bis-(4-hyroxyanil), biacetyl-bis-(2-methylthioanil), glyoxal-bis-(2,4,6-trimethylanil), glyoxal-bis-(2-methoxyanil), glyoxal-bis-(2,6-dimethylanil), biacetyl-bis-(2,5-dimethoxyanil), biacetyl-bis-(4-ethoxyanil), biacetyl-bis-(2-ethoxyanil), biacetyl-bis-(2-methylanil), biacetyl-bis-(3-methylanil), biacetyl-bis-(4-methylanil), glyoxal-bis-(4-methylanil), biacetyl-bis-(2,3-dimethylanil), biacetyl-bis-(2,4-dimethylanil), biacetyl-bis-(2,5-dimethylanil), biacetyl-bis-(2,6-dimethylanil), biacetyl-bis-(3,4-dimethylanil), biacetyl-bis-(3,5-dimethylanil), biacetyl-bis-(4-ethylanil), biacetyl-bis-(4-diethylaminoanil), biacetyl-bis-(2-isopropylanil), glyoxal-bis-(2-isopropylanil), and biacetyl-bis-(4-tert. butyl anil).

Of these ligands, those ligands which are preferred are the ligands in which R' and R" in the above mentioned formula represent benzene type substituents and of these the most preferred ligands are those which contain substitution at the 2 and/or 6 position of the benzene ring.

Another class of ligands which may be employed are those responding to the formula:

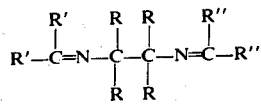

wherein R and R' each represent hydrogen and an alkyl radical of 1 to 6 carbon atoms or an aryl radical or a hydrocarbon radical of 4 to 10 carbon atoms containing double bond unsaturation in conjugation with the C=N unsaturation and at least one R' and at least one R" is a hydrocarbon radical containing double bond unsaturation in conjugation with the C=N unsaturation and R is hydrogen and alkyl radicals of 1–10 carbon atoms or a phenyl radical. Representative examples of such ligands are: N,N'-bis-(benzal)-ethylenediamine; N,N'-bis(benzal)-1,2-dimethylethylenediamine; N,N'-bis(2-methylbenzal)-ethylenediamine; N,N'-bis(3-methylbenzal)-ethylenediamine; N,N'-bis(4-methylbenzal)ethylenediamine; N,N'-bis-(4-diethylaminobenzal)-ethylenediamine; and other similar ligands.

Also, those ligands may be employed which respond to the formula:

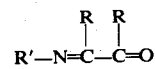

wherein R' and R are defined as previously indicated. Representative of such ligands are: biacetyl-(4-diethylaminoanil); glyoxal-(4-diethylaminoanil); biacetyl-(4-methylanil); glyoxal-(2-methylanil); glyoxal-(2,3-dimethylanil); glyoxal-(2,6-dimethylanil); biacetyl-(2,6-dimethylanil) and other similar ligands.

Also, those ligands responding to the formula:

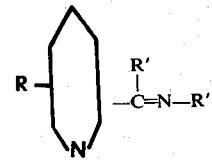

wherein R and R' are defined as previously indicated. Representative of such ligands are: 2-acetylpyridine-anil; 6-methyl-2-acetylpyridine-anil; 2-acetylpyridine-2-methylanil; 2-formylpyridine-anil; 6-methyl-2-formylpyridine-anil; 2-formylpyridine-3-methylanil; 2-acetylpyridine-2,6-dimethylanil; 2-acetylpyridine-2-chloroanil.

Of all the ligands useful in this invention, it is preferred to use the ligands represented by the formula

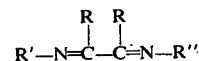

representative of which are glyoxal-bis-(2,6-dimethylanil) and glyoxal-bis-(2,4,6-trimethylanil).

The first step in the process of this invention is straightforward and requires no special techniques. It has been determined that the ligand to iron mole ratio of the catalyst system may vary over a wide range. Although there is no definite lower limit of ligand to use, sufficient ligand must be employed to assure a high selectivity to 1,5-cyclooctadiene. Likewise, there is no theoretical upper limit to the ligand/$Fe^{+++}$ mole ratio, but a large excess would be wasteful. It has been found that the ligand/$Fe^{+++}$ mole ratio between about 1/1 and 4/1 gives satisfactory results and a more preferred ratio is 1.5/1 to 3/1.

The mole ratio of the reducing agent to the iron may vary widely. While no absolute limits have been determined, it is noted that if the reducing agent is a monovalent metal compound, such as, for instance, alkyl lithium, the mole ratio of the reducing agent to the iron may vary between about 1/1 to about 60/1. A more preferred range would be 1/1 to 20/1 with most preferred range being 2/1 to 10/1. Another reducing agent is a multivalent organometallic, such as an alkyl aluminum compound, the mole ratio of the reducing agent/iron has been found to vary from about 1/1 to about 40/1. A more preferred range would be 1/1 to 20/1 with most preferred being 1/1 to 10/1.

The total amount of catalyst required in the invention is usually based on the amount of 1,3-butadiene in the crude C-4 hydrocarbon streams. Of course, a sufficient amount of the catalyst should be employed to cause cyclodimerization of the majority of the 1,3-butadiene in the crude C-4 streams for economic reasons. It has been found that the 1,3-butadiene to $Fe^{+++}$ mole ratio can vary from about 400/1 up to 10,000/1 or more.

The temperature at which the cyclodimerization of the butadiene values in the crude C-4 hydrocarbon stream is conducted may vary rather widely, but good results have been obtained at temperatures varying from about 50°C. up to about 130°C. It has been found that the best results are obtained at about 100°C.

The pressure at which this process of cyclodimerization is conducted has not been found to be critical and can range from ambient pressure to extremely high pressures. It is practical to employ any pressure from ambient up to about 400 psig.

This invention envisions the cyclodimerization of 1,3-butadiene values from a crude C-4 hydrocarbon stream. It is not necessary to conduct the cyclodimerization in the presence of an added inert diluent. The saturated hydrocarbons, such as isopentane and n-butane, will act as an inert diluent for purposes of temperature control. However, this is not to say that one cannot utilize an added inert diluent. If a diluent is employed, representative solvents, such as benzene, toluene, hexane, heptane, pentane are used. Toluene is the preferred solvent. From a practical standpoint and efficiency of the equipment employed, a large concentration of inert diluent should not be employed.

In the practice of this invention, it is usually desirable to employ air-free and moisture-free techniques as both air, oxygen and moisture have some adverse effect on the catalyst system.

The times required to complete the cyclodimerization of the butadiene values of the C-4 streams usually takes about 1 hour but longer times can be used.

The second step of the process of this invention which comprises a simple flash distillation to separate the C-4 hydrocarbons from the 1,5-cyclooctadiene and thereby recover the butadiene values from the crude C-4 stream is not complex and requires no special techniques. A simple flash distillation is all that is required. The boiling points of the normal C-4 hydrocarbons found in these crude C-4 streams range from about −7°C. to about 5°C. whereas the boiling point of 1,5-cyclooctadiene is 151°C. Thus, a simple flash distillation will remove the C-4 hydrocarbons to produce 1,5-cyclooctadiene of relatively high purity.

The practice of this invention is further illustrated by reference to the following examples which are intended to be representative rather than restrictive of the scope. Unless otherwise stated, the parts and percentages are by weight.

EXAMPLE I

In a heat dried stainless steel reactor containing 0.0006 mole of ferric octanoate and 0.0012 mole of glyoxal-bis-(2,4,6-trimethylanil) in 50 mls of dried benzene and under an atmosphere of nitrogen was charged with 40 grams of a raw C-4 effluent stream which had been passed as a gas through a bed of 3A molecular sieves. The ingredients in the reactor were continually stirred and heated to 100°C. at which time 0.0024 mole of triethyl aluminum in 10 ml of toluene was added. The pressure in the reactor was approximately 100 psig and remained constant after an elapse of 30 minutes, at which time a sample was withdrawn and the catalyst was quenched with 5 ml of water and 50 ml of toluene. A gas chromatographic analysis of the sample was made giving the following results. Of the butadiene contained in the crude C-4 stream, 82.7 percent by weight had been converted. A selectivity to 1,5-cyclooctadiene of 83.5 was obtained.

After the sample had been taken as indicated above, the reactor was allowed to cool to about 40° to 50° and the pressure relieved and the unreacted C-4 hydrocarbons were flashed off. The material remaining in the reactor was a relatively pure 1,5-cyclooctadiene.

EXAMPLE II

An experiment similar to that of Example I was conducted except that 22 grams of the crude C-4 stream was added to the reactor which contained 0.0006 mole of ferric octanoate and 0.0012 mole of the glyoxal-bis-(2,4,6-trimethylanil) in a solution of 25 ml of dried toluene. The contents of the reactor were stirred and heated until the temperature reached 100°C. at which time 0.024 mole of triethyl aluminum in 10 ml of toluene was added. After 35 minutes, the pressure remained constant and a sample was withdrawn and treated in the same manner as Example I. It was determined that 83.6 percent by weight of the butadiene values had been converted and a selectivity of 87.2 mole percent to cyclooctadiene was obtained.

After the sample had been taken as indicated above, the reactor was allowed to cool to about 40° to 50° and the pressure relieved and the unreacted C-4 hydrocarbons were flashed off. The material remaining in the reactor was a relatively pure 1,5-cyclooctadiene.

EXAMPLE III

In an experiment similar to that of Example I, to 43.0 grams (770 m moles) of 1,3-butadiene in 100 ml of dried toluene was added 7.7 m moles of a known impurity, 0.6 m moles of iron octanoate, 1.2 m moles of glyoxal-bis-(2,6-dimethylanil) and 2.4 m moles of diethyl aluminum. In these experiments the amount of impurity was 1 percent of the total butadiene or 10,000 ppm, and the impurity/iron mole ratio was 13 and the impurity/aluminum mole ratio was 3.3. The reactions were carried out at 100°C. for 1 hour with the entire system being protected with an atmosphere of nitrogen. The reactor was then opened and the unreacted butadiene and toluene as well as the impurities were flashed off.

The results are set forth in the following table in which Column 1 is the experiment number, Column 2 is the impurity, Column 3 is the conversion of the butadiene in weight percent and Column 4 is the selectivity to 1,5-cyclooctadiene in mole percent.

| No. | Impurity | Conversion | Selectivity |
|---|---|---|---|
| 1 | 1-butyne | 94.8 | 93.4 |

-Continued

| No. | Impurity | Conversion | Selectivity |
|---|---|---|---|
| 2 | 2-butyne | 90.5 | 92.4 |
| 3 | vinylacetylene | 86.4 | 90.0 |

Another run was carried out in which the butadiene was not initially present. The reactor contained 114 m moles of vinylacetylene at a vinylacetylene/iron mole ratio of 240 in 100 ml of dried toluene. To this mixture was then added 0.6 m mole of iron octanoate, 1.2 m moles of glyoxal-bis-(2,6-dimethylanil), and 2.4 m moles of diethyl aluminum. This reaction mixture was heated then to 100°C. for 15 minutes at which time there was charged to the reactor 230 m moles of butadiene. After allowing the butadiene to react at 100°C. for about 1 hour, the reactor was opened and the unreacted butadiene allowed to flash off. It was determined that 41.0 weight percent had been converted and the selectivity to 1,5-cyclooctadiene was 80.5 mole percent. This experiment indicates that the catalyst system is only slightly inhibited by very large amounts of the normal impurities such as vinylacetylene, 1-butyne and 2-butyne.

Other experiments have indicated that the catalyst system of this invention functions normally to cyclodimerize 1,3-butadiene values from impure C-4 hydrocarbon streams which contain as much as 100 ppm of cyclopentadiene. In those experiments, which were similar to that above, the conversion of butadiene was 86.2 percent by weight and the selectivity to 1,5-COD was 95.0 mole percent.

While certain representative embodiments and details have been shown for the purpose of illustrating the invention, it will be apparent to those skilled in this art that various changes and modifications may be made therein without departing from the spirit or scope of the invention.

What is claimed is:

1. The method of recovering the 1,3-butadiene values from a commercial C-4 hydrocarbon stream which comprises subjecting a commercial C-4 stream containing from about 20 to about 40 percent by weight of butadiene and containing other C-4 hydrocarbons from the group of isobutylene, cis and trans-2-butene, 1-butene, n-butane and isobutane resulting from the steam cracking or naphtha or gas oil to a catalyst comprising (1) at least one material selected from the group consisting of iron salts and iron complexes, (2) at least one reducing agent selected from the group consisting of organometallic compounds and metallic hydrides, the metal portions of which are selected from Groups I$a$, II$a$, II$b$ and III$a$ of the Periodic System of Elements and (3) at least one ligand selected from the group represented by the formulae:

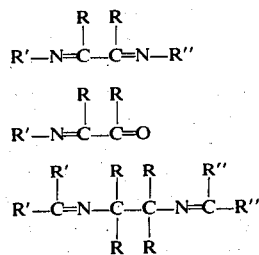

and

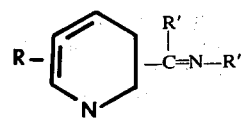

wherein R may be hydrogen, an alkyl group of 1 to 6 carbon atoms or an aryl radical, and R' and R'' are hydrocarbons of 4 to 10 carbon atoms and containing double bond unsaturation in conjugation with the C=N unsaturation, and wherein N is nitrogen and O is oxygen, in which the ligand/Fe$^{+++}$ mole ratio ranges between about 1/1 and about 4/1 and the mole ratio of the reducing agent/iron ranges between about 1/1 and about 60/1, then subjecting the mixture to a simple flash distillation to separate the C-4 hydrocarbons from the 1,5-cyclooctadiene.

2. The method according to claim 1 in which (1) is an iron salt of a carboxylic acid, (2) is an aluminum trialkyl and (3) is a ligand of the formula:

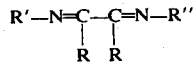

wherein R is a hydrogen, an alkyl group of 1 to 6 carbon atoms or an aryl radical; R' and R'' are hydrocarbons of from 4 to 10 carbon atoms and containing double bond unsaturation in conjugation with the C=N unsaturation.

3. The method according to claim 2 in which the ligand is selected from the group of glyoxal-bis-(2,6-dimethylanil) and glyoxal-bis-(2,4,6-trimethylanil).

* * * * *